United States Patent
Williams

(10) Patent No.: US 7,734,394 B2
(45) Date of Patent: Jun. 8, 2010

(54) SYSTEM AND METHOD FOR SENSING SOIL- AND CURB-TRIPPED ROLLOVER EVENTS

(75) Inventor: Kyle Williams, Shelby Township, MI (US)

(73) Assignee: Robert Bosch GmbH (DE)

( * ) Notice: Subject to any disclaimer, the term of this patent is extended or adjusted under 35 U.S.C. 154(b) by 1031 days.

(21) Appl. No.: 11/408,716

(22) Filed: Apr. 21, 2006

(65) Prior Publication Data

US 2006/0253239 A1 Nov. 9, 2006

Related U.S. Application Data

(60) Provisional application No. 60/674,469, filed on Apr. 25, 2005.

(51) Int. Cl.
*B60R 22/00* (2006.01)

(52) U.S. Cl. ............... 701/45; 701/36; 701/70; 340/439; 180/232; 180/268; 180/271

(58) Field of Classification Search ........... 701/38, 701/36, 45, 70, 110; 340/429, 440, 438, 340/439, 472, 903; 180/170, 197, 232, 268, 180/271

See application file for complete search history.

(56) References Cited

U.S. PATENT DOCUMENTS

| | | | |
|---|---|---|---|
| 5,282,134 A | 1/1994 | Gioutsos et al. |
| 5,339,242 A | 8/1994 | Reid et al. |
| 5,483,449 A | 1/1996 | Caruso et al. |
| 5,583,771 A | 12/1996 | Lynch et al. |
| 5,667,244 A | 9/1997 | Ito et al. |
| 5,790,404 A | 8/1998 | Faye et al. |
| 6,002,975 A | 12/1999 | Schiffmann et al. |
| 6,038,495 A | 3/2000 | Schiffmann |
| 6,061,616 A | 5/2000 | Ohno et al. |
| 6,301,536 B1 | 10/2001 | Vaessen et al. |
| 6,421,592 B1 | 7/2002 | Bärgman et al. |
| 6,529,811 B2 | 3/2003 | Watson et al. |
| 6,542,073 B2 | 4/2003 | Yeh et al. |
| 6,607,212 B1 | 8/2003 | Reimer et al. |
| 6,618,655 B2 | 9/2003 | Tobaru et al. |
| 6,654,671 B2 | 11/2003 | Schubert |
| 6,687,576 B2 | 2/2004 | Mattes et al. |
| 6,694,225 B2 | 2/2004 | Aga et al. |
| 6,826,468 B2 | 11/2004 | Williams |
| 6,856,868 B1 | 2/2005 | Le et al. |

(Continued)

FOREIGN PATENT DOCUMENTS

WO 2005030536 4/2005

OTHER PUBLICATIONS

United States Patent and Trademark Office, Office Action Summary, regarding U.S. Appl. No. 10/899,521 dated Oct. 3, 2007.

*Primary Examiner*—Gertrude Arthur Jeanglaud
(74) *Attorney, Agent, or Firm*—Michael Best & Friedrich LLP

(57) ABSTRACT

A method and a system of controlling a restraint device in a vehicle during a crash. The method includes sensing a lateral condition, classifying the crash, sensing a roll value, comparing the roll value with a plausibility region, and activating the restraint device based on the classified crash and when the roll value falls within the plausibility region.

22 Claims, 11 Drawing Sheets

U.S. PATENT DOCUMENTS

| | | | |
|---|---|---|---|
| 2002/0075140 A1* | 6/2002 | Yeh et al. ............... 340/438 |
| 2002/0087235 A1 | 7/2002 | Aga et al. |
| 2002/0169577 A1 | 11/2002 | Mattes et al. |
| 2002/0189883 A1 | 12/2002 | Lahmann et al. |
| 2003/0158633 A1* | 8/2003 | Schubert ................... 701/1 |
| 2003/0182041 A1 | 9/2003 | Watson |
| 2003/0182042 A1 | 9/2003 | Watson et al. |
| 2004/0002802 A1 | 1/2004 | Ide et al. |
| 2004/0176893 A1 | 9/2004 | Ogata et al. |
| 2004/0199317 A1 | 10/2004 | Ogata et al. |
| 2005/0209757 A1 | 9/2005 | Kueblbeck et al. |

\* cited by examiner

SYSTEM AND METHOD FOR SENSING SOIL- AND CURB-TRIPPED ROLLOVER EVENTS

RELATED APPLICATIONS

This application claims the benefit of U.S. Provisional Application Ser. No. 60/674,469 filed on Apr. 25, 2005, the entire content of which is incorporated by reference herein.

BACKGROUND

Embodiments of the invention relate to a rollover-sensing system, and particularly to a rollover-sensing system that senses soil-tripped rollover events, curb-tripped rollover events, or both.

Vehicle rollover events are situations in which vehicle occupants are at risk of serious injury. To protect the vehicle occupants from injury, vehicles typically include restraint devices such as airbags and seatbelts that can be actuated during a rollover or possible rollover. The accuracy and timeliness of deployment and actuation of these restraint devices are factors in their effectiveness.

There are different types of rollover events. For example, a vehicle can be involved in an upward rollover event when the vehicle is traveling in a forward direction, and then travels across an object or an inclined surface resulting in an upward roll. A vehicle can be involved in a downward rollover event when the vehicle is traveling in a forward direction, and then travels across an object or a declined surface resulting in a downward roll. A vehicle can be involved in a soil- or curb-tripped rollover event. A soil-tripped rollover event occurs when the vehicle is initially traveling on a roadway, and begins a slide that takes the vehicle off the roadway. As the vehicle slides off the roadway, the wheels of the vehicle may contact unpaved ground, grass, or soil. Soil may build up near the wheels of the vehicle and create a lip or mound of soil. The mound may reach a sufficient size or configuration such that it acts as a barrier over which the wheels and, consequently, the vehicle trip. A curb-tripped rollover event occurs when the vehicle is initially traveling on a roadway, and then slides sideways into a curb that acts as a barrier over which the wheels and, consequently, the vehicle trip.

SUMMARY

Simply detecting the existence of a rollover event can be useful. However, numerous factors may be involved in determining when and how to deploy vehicle restraint devices before or upon the occurrence of a rollover event. For example, in a soil- or curb-tripped rollover event, the vehicle experiences a lateral deceleration when it contacts the soil or curb (before the actual rollover occurs). The lateral deceleration often causes the vehicle occupants to move rapidly into positions within the vehicle that may be unsafe. In such cases, restraint devices have to be deployed before the vehicle occupants are moved out of a seating position into other and possibly unsafe positions within the vehicle. In other words, if restraint devices are deployed at the time vehicle rollover occurs, the occupants may have already moved to positions where activation of the restraint devices is ineffective or injurious.

Some current vehicles include roll rate sensors that are configured to sense the rate of change of the roll angle experienced by the vehicle, lateral acceleration sensors that are configured to sense the lateral deceleration experienced by the vehicle, and processors that process the data from these sensors. However, these processors are often unable to determine whether to deploy the restraint devices before the occupants have moved into positions within the vehicle that may be unsafe and, therefore, are not always adequate for use in an occupant safety system, particularly when trying to protect occupants during a partial or complete soil- or curb-tripped rollover.

Accordingly, there is a need to improve the deployment of restraint devices before a possible rollover event occurs. In one embodiment, the invention provides a rollover sensing system that performs fast classification and discrimination of soil- and curb-tripped rollover events so that the restraint devices can be deployed early in the event but without deploying the restraint devices during events in which the vehicle rolls only partially.

In another embodiment, the invention provides a method of controlling a restraint device in a vehicle during a possible crash. The method includes sensing a lateral acceleration or something that is representative or indicative of a lateral acceleration of the vehicle, and classifying the crash based on the lateral acceleration. The method also includes determining if a lateral acceleration threshold is crossed based on the lateral acceleration, determining a roll value or something that is representative or indicative of a roll of the vehicle, and determining if a roll value threshold is crossed based on the roll value. The method also includes activating the restraint device when the lateral acceleration threshold is crossed and the roll value threshold is crossed.

Another embodiment includes a method of controlling a restraint device in a vehicle during a possible crash. The method includes sensing a first signal that is indicative of the lateral acceleration of the vehicle, and determining a second signal from the first signal indicative of the lateral acceleration. The method also includes retrieving a region (representing, in one embodiment, a range of lateral accelerations and a corresponding range of change in acceleration) that is established based on the first signal and the second signal, comparing the first and second signals with the region, and activating the restraint device based on the comparison.

Yet another embodiment provides a system for controlling a restraint device in a vehicle during a possible crash. The apparatus includes a sensor to sense a plurality of vehicle conditions having values that are indicative of vehicle lateral accelerations. The system also includes a classifier to classify the crash based on the lateral accelerations. The system also includes a comparator that compares the lateral accelerations with a lateral acceleration threshold, and a roll characteristic signal generator that determines a roll value that can be based on a roll rate, a roll acceleration, and a roll angle, and compares the roll value with a roll value threshold. The system also includes a signal generator to activate the restraint device when the lateral acceleration threshold is crossed and the roll value threshold is crossed.

Yet another embodiment provides a method of controlling a restraint device in a vehicle during a crash. The method includes sensing a lateral condition experienced by the vehicle, and classifying the crash based on the lateral condition. The method also includes sensing a roll value experienced by the vehicle, comparing the roll value with a plausibility region, and activating the restraint device based on the classified crash and when the roll value falls within the plausibility region.

Yet another embodiment provides a method of controlling a restraint device in a vehicle during a crash. The method includes sensing a first signal indicative of a lateral acceleration of the vehicle, and determining a second signal from the first signal indicative of the lateral acceleration. The method also includes retrieving a trip-rollover region representing lateral accelerations and changes in lateral acceleration based on the first and second signals, sensing a third signal indicative of a roll rate of the vehicle, and determining a fourth signal from the third signal indicative of the roll rate of the vehicle. The method also includes retrieving a plausibility region representing roll rates and changes in roll rate based on the third and fourth signals, and activating the restraint device when the first and second signals are in the trip-rollover region, and when the third and fourth signals are in the plausibility region.

Yet another embodiment provides a system for controlling a restraint device in a vehicle during a crash. The system includes a lateral condition sensor to sense a lateral condition experienced by the vehicle, and a roll sensor configured to sense a roll condition experienced by the vehicle. The system also includes a classifier that classifies the crash based on the lateral condition, a comparator that compares the sensed roll value with a plausibility region, and a signal generator that activates the restraint device based on the classified crash and when the roll value falls within the plausibility region.

Other aspects of the invention will become apparent by consideration of the detailed description and accompanying drawings.

The patent or application file contains at least one drawing executed in color. Copies of the patent or patent application publication with color drawings(s) will be provided by the Office upon request and payment of the necessary fee.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

As should also be apparent to one of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Terms like "processor" may include or refer to both hardware and/or software. Furthermore, throughout the specification capitalized terms are used. Such terms are used to conform to common practices and to help correlate the description with the coding examples, equations and/or drawings. However, no specific meaning is implied or should be inferred simply due to the use of capitalization. Thus, unless specifically indicated otherwise, the claims should not be limited to the specific examples or terminology or to any specific hardware or software implementation or combination of software or hardware.

Embodiments of the invention relate to a method and system for controlling a restraint device in a vehicle during a possible crash. In one embodiment, the possible crash is classified based on parameters such as lateral accelerations, and a number of parameters are considered and compared with a plurality of thresholds. In a specific embodiment, the system includes a sensor to sense a plurality of vehicle conditions having values that are indicative of vehicle lateral accelerations. The system also includes a classifier to classify the impending crash based on the lateral accelerations. The system also includes a comparator that compares the lateral accelerations with a lateral acceleration threshold, and a roll characteristic signal generator that determines a roll value which can be based on a roll rate, a roll acceleration, and a roll angle, and compares the roll value with a roll value threshold. The system also includes a signal generator to activate the restraint device when the lateral acceleration threshold is crossed and the roll value threshold is crossed.

Figure 1:
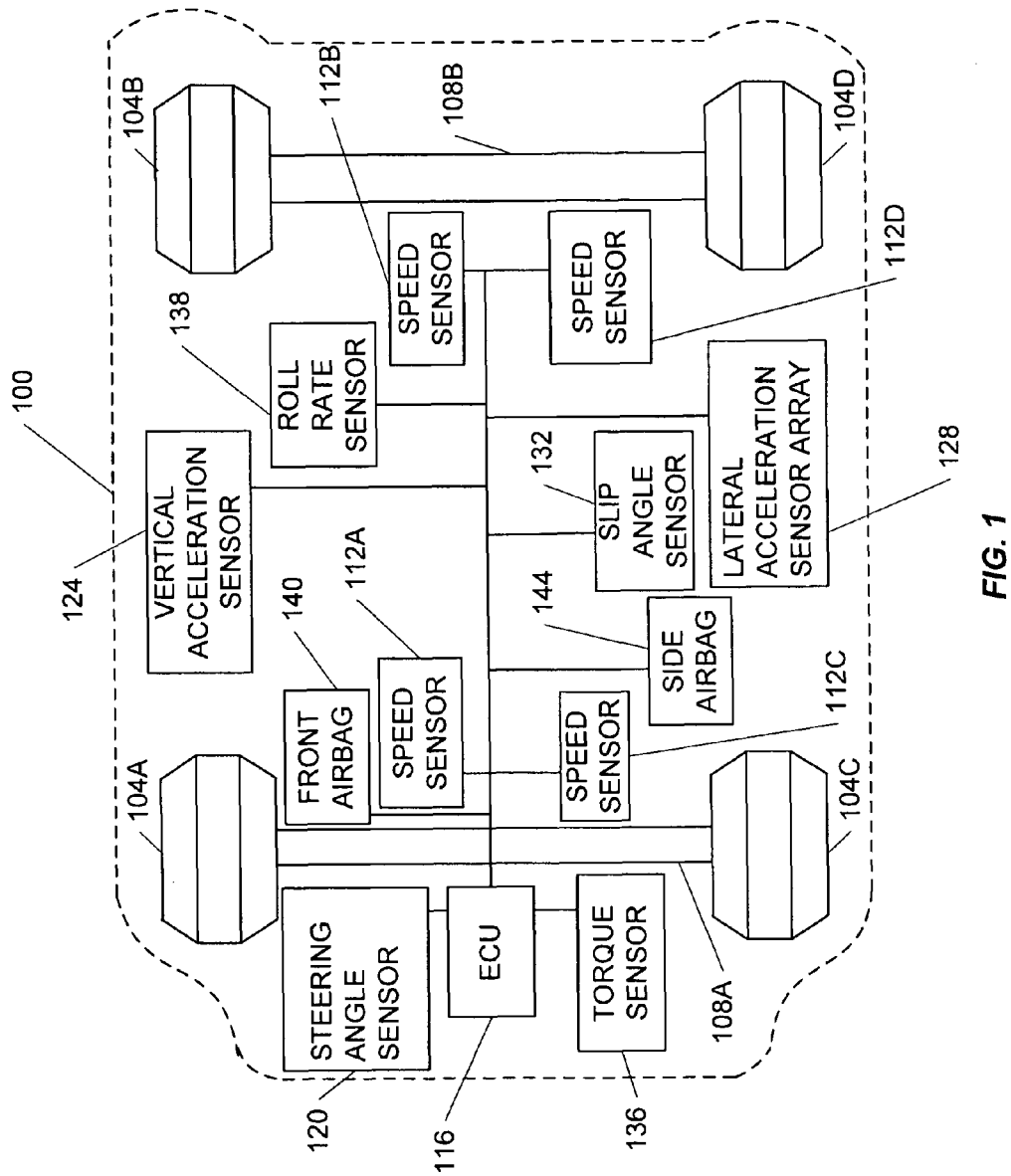
FIG. 1 is a schematic plan view of a vehicle.

FIG. 1 shows a schematic plan view of a vehicle 100. The vehicle 100 has four wheels 104A, 104B, 104C, and 104D. In some other embodiments, the vehicle 100 can have a different number of wheels. The wheels 104A, 104B, 104C, and 104D are connected to two axles 108A and 108B, as shown. The four wheels are monitored by a plurality of wheel speed sensors 112A, 112B, 112C, and 112D. The wheel speed sensors 112A, 112B, 112C, and 112D are coupled to an electronic processing unit ("ECU") 116. The vehicle 100 also includes other sensors such as a steering angle sensor 120, a vertical acceleration sensor 124, and a lateral acceleration sensor array 128. The wheel speed sensors 112A, 112B, 112C, and 112D, the steering sensor 120, the vertical acceleration sensor 124, and the lateral acceleration sensor array 128 are shown as individual sensors generically. These sensors 112A, 112B, 112C, 112D, 120, 124, and 128 can also include multiple sensors in a plurality of sensor arrays, for example, that may be coupled to the ECU 116. Other sensors such as body slip angle sensor 132, an engine torque sensor 136, and a roll sensor array 138 can also be used in the vehicle 100. Robert Bosch GmbH manufactures RoSe Ie sensors that can generate roll rate signals, lateral acceleration signals, and vertical acceleration signals. These sensors can be used in embodiments of the invention. The vehicle 100 also includes a plurality of restraint devices such as front airbags 140, and side airbags 144. Although FIG. 1 shows only two types of restraint devices, other types of restraint devices such as seatbelt tensioners, and head and torso airbags can also be used in the vehicle 100.

Sensors such as the wheel speed sensors 112A, 112B, 112C, and 112D detect and monitor a condition of each of the wheels 104A, 104B, 104C, and 104D that is indicative of an amount of velocity experienced by the vehicle 100. Sensors such as the steering angle sensor 120, the roll sensor array 138, and the torque sensor 136 are configured to detect a plurality of conditions of the vehicle 100. Collectively, values of the signals output by the sensors 112A, 112B, 112C, 112D, 120, 124, 128, 132, 136, and 138 are referred to as sensed values, or values hereinafter.

In one form, each of the sensors 112A, 112B, 112C, 112D, 120, 124, 128, 132, 136, and 138 detects and monitors a condition of the vehicle 100. For example, the lateral acceleration sensor array 128 is used to sense a condition of the vehicle 100 that is indicative of an amount of lateral acceleration experienced by the vehicle 100. In some embodiments, the lateral acceleration sensor array 128 can contain side-impact sensors or high-force lateral acceleration sensors that can be used to sense side crash forces, and a low-force lateral acceleration sensor that can be used to sense rollover crash forces. If the sensor array 128 is equipped with calibration circuitry or microprocessors therein, the motions can be converted internally to a calibrated form. Otherwise, the conditions can be converted into calibrated signals by other external processes in a manner known in the art.

It should also be noted that the sensed values can come directly or indirectly from the sensors such as the lateral acceleration sensor array 128 and the roll sensor array 138. The sensed values can be sent or delivered to the ECU 116 via other vehicle systems. These other vehicle systems can include, but are not limited to, an antilock braking controller, an electronic stability controller, a restraint electronics controller, and the like. It should also be noted that the sensed values can also be configured to be available at the ECU 116 using direct electrical connections from the sensors such as the lateral acceleration sensor array 128 and the roll sensor array 138, direct electrical connections to other vehicle systems, or via a vehicle communication bus, in a known manner.

Figure 2:
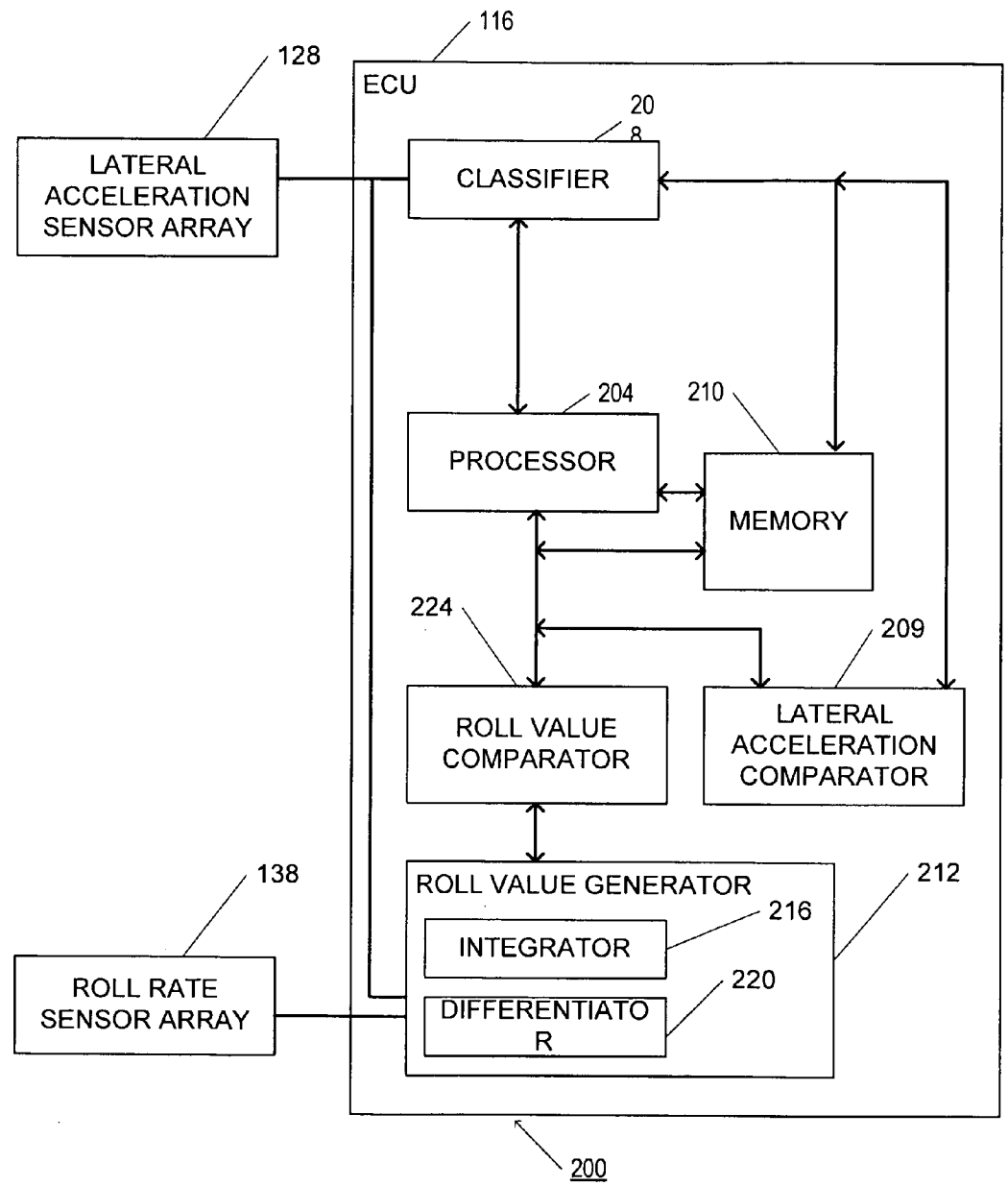
FIG. 2 is a block diagram of a control system in the vehicle of FIG. 1.

FIG. 2 shows a control system 200 used in the vehicle 100 of FIG. 1 in block diagram format. The ECU 116 includes a processor 204 that receives values from sensors such as the lateral acceleration sensor array 128 and the roll sensor array 138. Particularly, the sensed values from the lateral acceleration sensor array 128 are entered into a classifier 208 for crash classification, detailed hereinafter. The ECU 116 also includes a lateral acceleration comparator 209 that receives data such as the sensed values from the lateral acceleration sensor array 128, compares the values with some lateral acceleration threshold stored in a memory 210, and generates a lateral acceleration comparison result signal. The ECU 116 also includes a roll value generator 212 that further includes an integrator 216 and a differentiator 220. The roll value generator 212 receives the sensed values from the lateral acceleration sensor array 128 and the roll sensor array 138, and generates at least one roll value. A roll value comparator 224 then compares the roll value with a corresponding roll value threshold from the memory 210, and generates a roll value comparison result signal. The processor 204 then processes the lateral acceleration comparison result signal and the roll value comparison result signal to determine whether the restraint devices of the vehicle 100 should be deployed, as will be discussed below.

The ECU 116 can include other signal processing hardware and software needed to filter and process the data from the sensors such as the lateral acceleration sensor array 128 and the roll sensor array 138. The ECU 116 can be configured to perform analog hardware filtering, signal amplification, analog-to-digital conversion, digital software filtering, signal offset compensation, signal clipping, signal integration, and signal differentiation.

The classifier 208 generally classifies a crash as a soil-tripped rollover, a curb-tripped rollover or an un-tripped rollover. Particularly, the classifier 208 receives the sensed values from the lateral acceleration sensor array 128 and classifies the crash based on the sensed values from the lateral acceleration sensor array 128. In some embodiments, the classifier 208 first determines a derivative, a slope, or a rate of change of the sensed values from the lateral acceleration sensor array 128. In other embodiments, the ECU 116 includes other processes to determine the derivates of the sensed values from the lateral acceleration sensor array 128, and to provide the classifier 208 with the derivatives. The classifier 208 then determines a classification of the crash based on comparing the lateral acceleration signals from the lateral acceleration sensor array 128 and the derivative of the lateral acceleration signal to predetermined threshold regions or soil-tripped and curb-tripped classification regions that can be stored in the memory 210.

Figure 3:
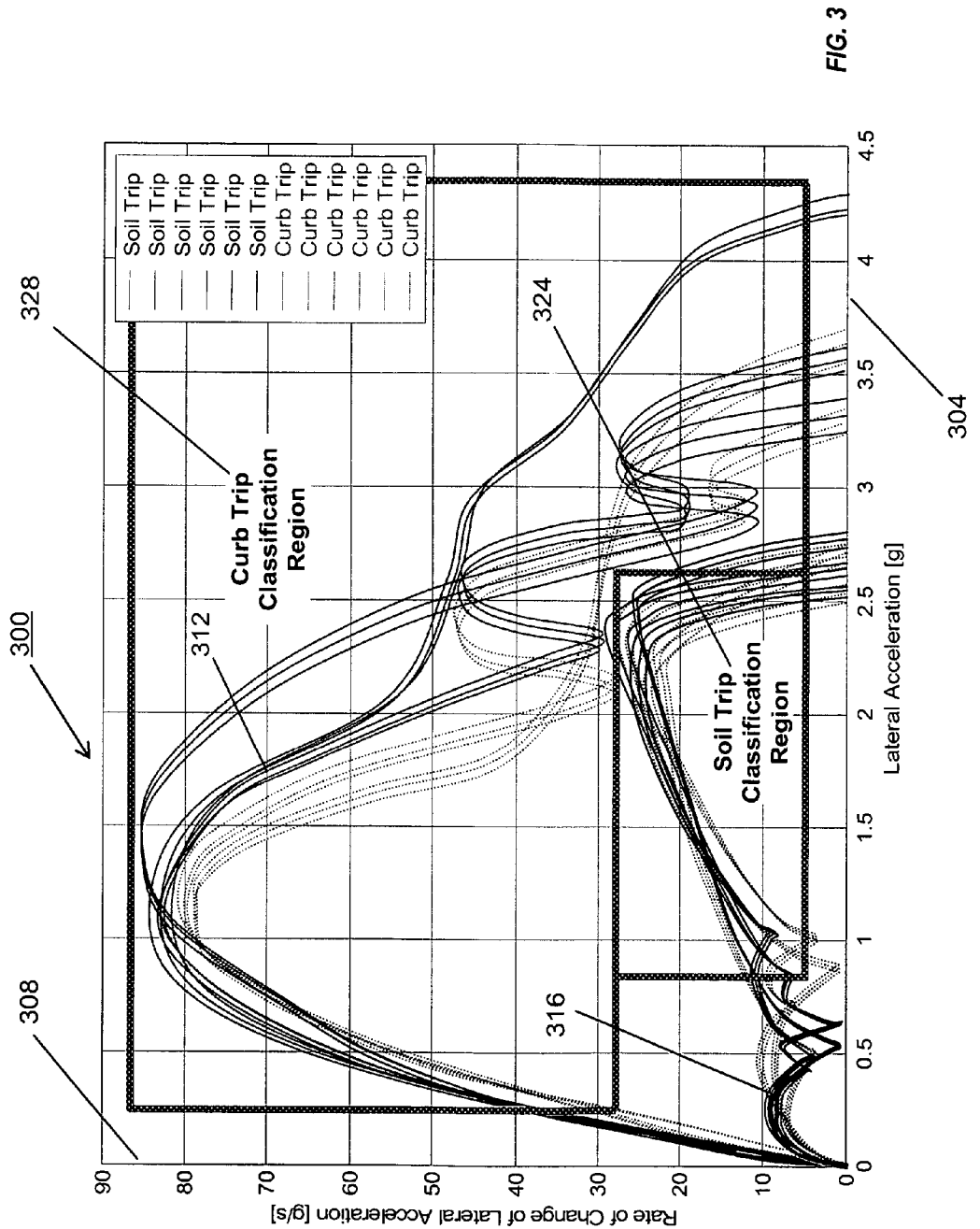
FIG. 3 is a graph of a soil- and curb-tripped crash classification plot.

The soil-tripped classification region is generally defined by calibrating a set of points in a two-dimensional space defined by the lateral acceleration sensed values and the derivative. FIG. 3 illustrates an exemplary calibration 300. Sensed values of the lateral acceleration are measured along an x-axis 304, and values of the rate of change of the lateral acceleration (or lateral jerk) are measured along a y-axis 308. Curves 312 illustrate crashes that are considered curb-tripped rollover crashes, whereas curves 316 illustrates crashes that are considered soil-tripped rollover crashes. A two-dimensional classification region 324 is defined as a soil-tripped rollover region. If signals that enter the soil-tripped classification region 324 are classified as soil-tripped crashes, the classifier 208 then generates a "SOIL TRIP" output signal to processor 204 for further processing. Another two-dimensional classification region 328 is defined as a curb-tripped rollover region. If signals that enter the curb-tripped classification region 328 are classified as curb-tripped crashes, the classifier 208 then generates a "CURB TRIP" output signal to processor 204 for further processing. On the other hand, signals that are outside of the soil-tripped classification region 324 and the curb-tripped classification region 328 are classified as non-trip crashes, and the classifier 208 generates a "NON TRIP" output signal to processor 204 for further processing.

Figure 4:
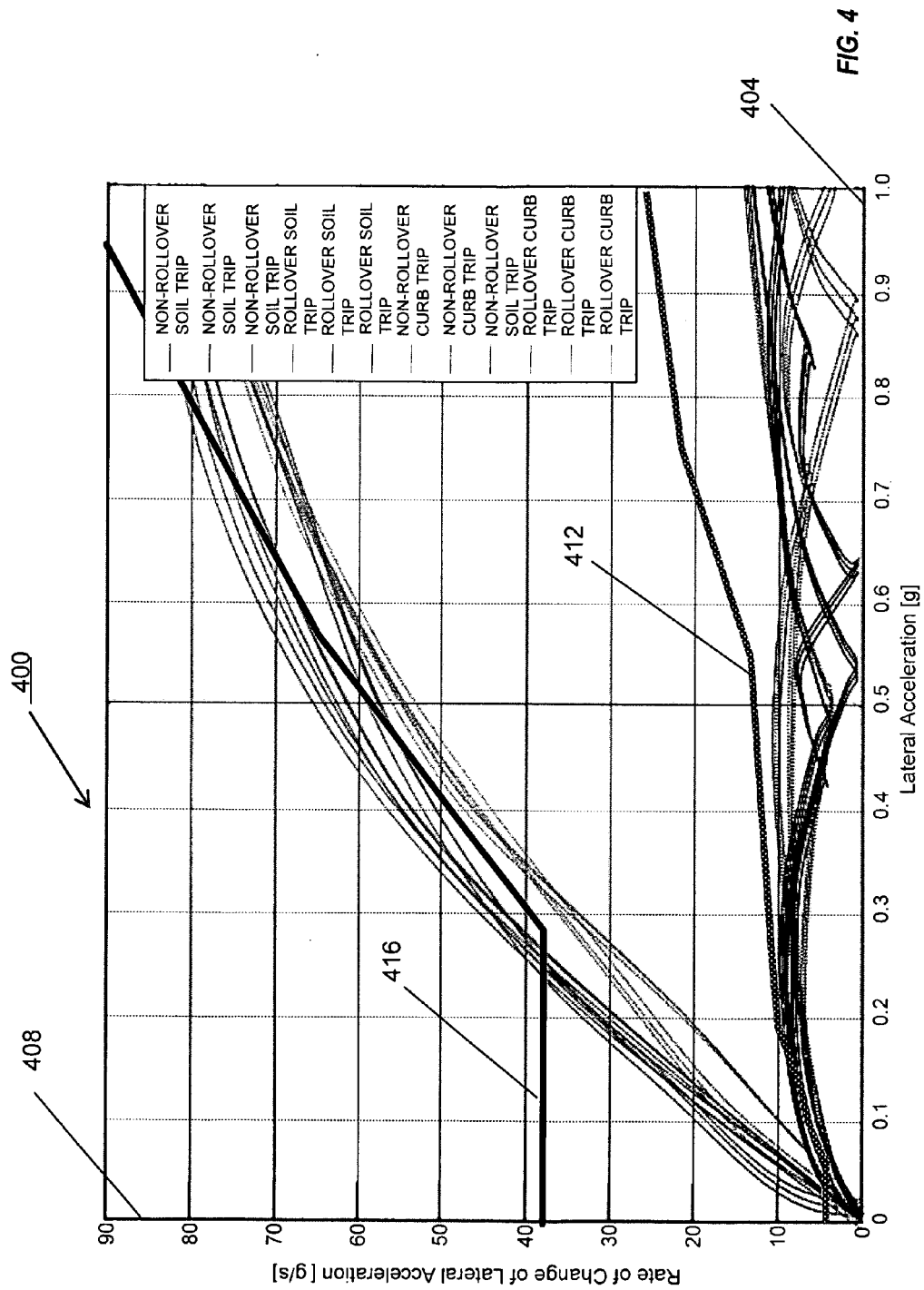
FIG. 4 is a graph of a soil- and curb-tripped rollover threshold plot.

If the classifier 208 classifies a crash or event as a soil-trip rollover, the lateral acceleration comparator 209 processes the lateral acceleration sensed values and the derivative directly from the classifier 208 or indirectly through the processor 204. In particular, the lateral acceleration comparator 209 compares the lateral acceleration sensed values and the derivative with a lateral acceleration threshold. FIG. 4 illustrates an exemplary comparison plot 400 which is a portion of FIG. 3. Sensed values of the lateral acceleration are measured along an x-axis 404, and values of the rate of change of the lateral acceleration are measured along a y-axis 408. Curve 412 illustrates an exemplary soil-tripped rollover threshold. Soil-tripped signals whose lateral acceleration value and the corresponding derivative value exceed the threshold curve 412 are classified as soil-tripped rollover crashes. The lateral acceleration comparator 209 then generates a "TRUE" output signal to processor 204 for further processing. On the other hand, soil-tripped signals that are below the threshold curve 412 are classified as soil-tripped, non-rollover crashes. The classifier 208 then generates a "FALSE" output signal to processor 204. In some embodiments, the soil-tripped, rollover classification requires a hold time to ensure an adequate classification. In other words, a decision is held or not acted upon until certain additional processing is complete.

If the classifier 208 classifies a crash or event as a curb-trip rollover, the lateral acceleration comparator 209 processes the lateral acceleration sensed values and the derivative directly from the classifier 208 or indirectly through the processor 204. In particular, the lateral acceleration comparator 209 compares the lateral acceleration sensed values and the derivative with a lateral acceleration threshold. Curve 416 of FIG. 4 illustrates an exemplary curb-tripped rollover threshold. Curb-tripped signals whose lateral acceleration value and the corresponding derivative value exceed the threshold curve 416 are classified as curb-tripped rollover crashes. The lateral acceleration comparator 209 then generates a "TRUE" output signal to processor 204 for further processing. On the other hand, curb-tripped signals that are below the threshold curve 416 are classified as curb-tripped, non-rollover crashes, the classifier 208 then generates a "FALSE" output signal to processor 204 for further processing. In some embodiments, the curb-tripped rollover classification requires a hold time to ensure an adequate classification. In other words, a decision is held or not acted upon until certain additional processing is complete.

Referring back to FIG. 2, the roll value generator 212 receives sensed values from the roll rate sensor or the roll sensor array 138. The roll value generator 212 and the roll value comparator 224 provide a robustness of the sensors used in the vehicle 100 against sensor failures, against aggressive driving maneuvers in which the vehicle does not slide and against side impact crashes, and thereby provides a plausibility of the soil-tripped conditions. In the embodiment shown, the roll value generator 212 uses sensed values from the roll rate sensor array 138 and the lateral acceleration sensor array 128 to ensure that a failure of a sensor within the lateral acceleration sensor array 128 will not result in an undesired decision to deploy the restraint devices 140, 144.

In order to provide increased robustness, a second lateral acceleration sensor signal from the lateral acceleration sensor array 128 such as a high-force lateral acceleration sensor signal can also be compared to one or more predetermined thresholds. Although the resolution of high-force lateral acceleration sensors is relatively low (a value of about 0.2 g), high-force lateral acceleration sensors can provide enough resolution to implement a lateral acceleration plausibility threshold with a value of about 1 g.

The lateral acceleration plausibility threshold region can be defined by calibrating a set of points in a four-dimensional space defined by the roll rate signal from the roll rate sensor array 138, a derivative or roll acceleration from the differentiator 220, an integral or roll angle from the integrator 216, and the lateral acceleration signal. For example, an exemplary calibration can be defined by eight points in a three-dimensional space or the eight corners of a rectangular box that includes the lateral acceleration values, the roll rate values, and the roll acceleration values. Signals that are inside the lateral acceleration plausibility threshold region are considered plausible. The roll value comparator 224 then generates a "TRUE" output signal to the processor for further processing. On the other hand, signals that are outside the lateral acceleration plausibility threshold region are considered implausible, and the roll value comparator 224 then generates a "FALSE" output signal to processor 204.

In some other embodiments, more than eight points could be used to create any type of shape or to create multiple shapes within the three-dimensional space as described earlier. It should also be noted that more or less than three dimensions can also be used for the lateral acceleration plausibility threshold region. For example, the lateral acceleration plausibility threshold region can be defined by one or more four-dimensional regions within the four-dimensional space defined by the roll rate values, the roll acceleration values, the roll angles, and the lateral acceleration values. As another example, the lateral acceleration plausibility threshold region can be defined by one or more polygons in the two-dimensional space defined by the roll rate signal and the lateral acceleration signal, or one or more polygons in the two-dimensional space defined by the roll rate signal and the roll acceleration signal. It should also be noted that these calibration points would normally be defined based on an analysis of a set of rollover crash test data or by running rollover crash simulations prior to vehicle production.

Figure 5:
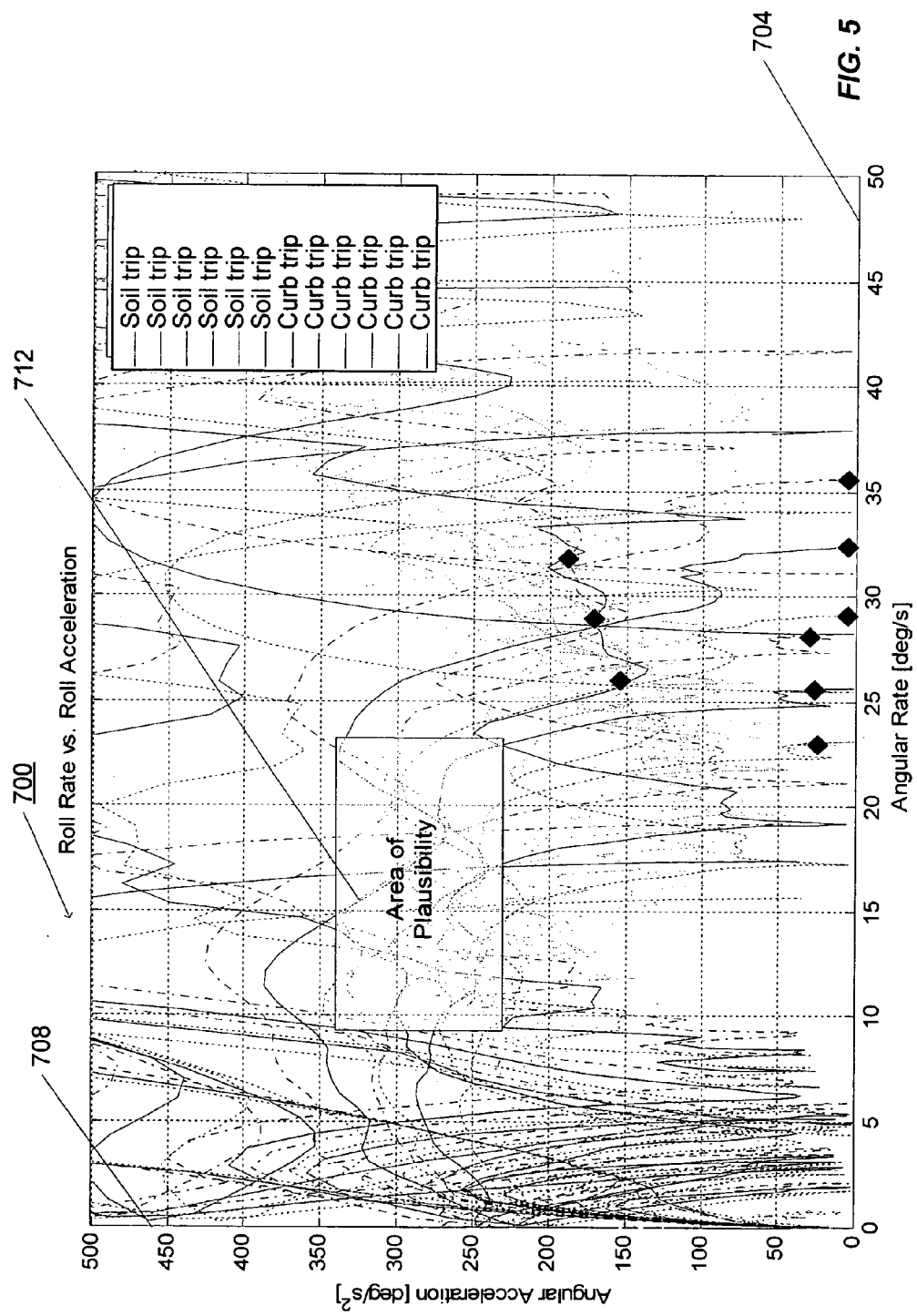
FIG. 5 is an exemplary plausibility area plot.

FIG. 5 shows an exemplary plausibility area plot 700. Values of the roll rate or the angular rate are measured along an x-axis 704, and values of the roll acceleration or the angular acceleration are measured along a y-axis 708. FIG. 5 also shows an exemplary plausibility area or plausibility function 712. In the embodiment shown in FIG. 5, the plausibility area 712 is a two-dimensional area using roll rate and roll acceleration. In some other embodiments, the plausibility area 712 can also be bounded in a 3-dimensional plot of roll angle, roll rate, and roll acceleration. For curb-tripped rollover and ramp/ditch events, a standard plausibility test can be used, along with the angle versus the angular rate threshold criteria.

Figure 6:
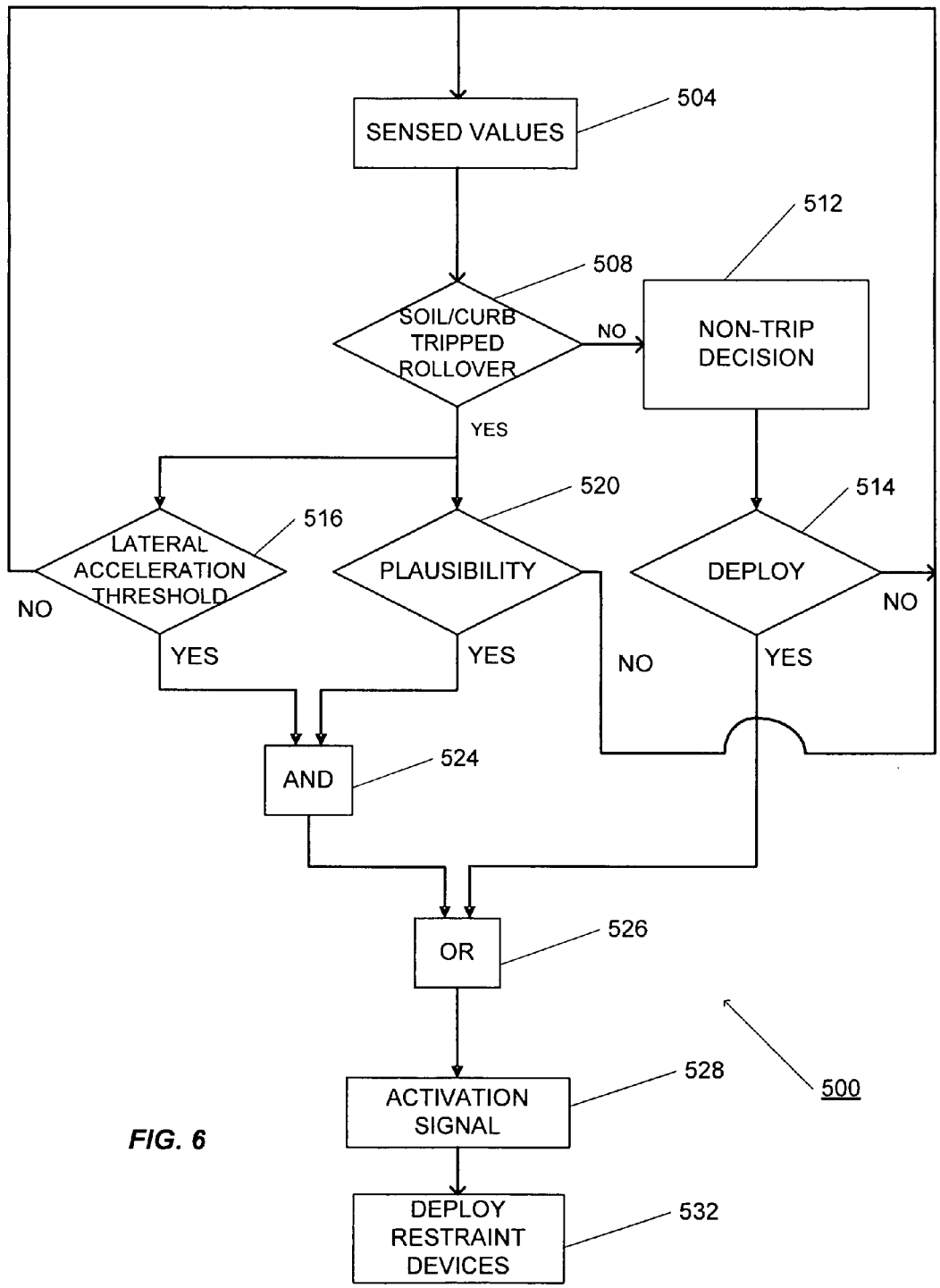
FIG. 6 is a flow chart of processing carried out in certain embodiments of the invention.

FIG. 6 includes a flow chart 500 that further illustrates processes that occur in some embodiments including processes that may be carried out by software, firmware, or hardware. As noted, the sensors sense lateral accelerations and other parameters as sensed values. This is shown at block 504. Vehicle crash conditions, such as the lateral accelerations, are classified at block 508. If the crash is considered to be an un-tripped rollover crash or event, the ECU 116 or the processor 204 (FIG. 2) processes the sensed values according to a rules set or processes established for un-tripped rollover events (which may include known processes), as shown at block 512. In some embodiments, the rules or processes can include several subprocesses, such as an un-tripped crash classification process, an un-tripped threshold comparison process, and an un-tripped plausibility process. If the un-tripped rollover requires deployment of the restraint devices 140, 144, as determined at block 514, the ECU 116 (FIG. 2) generates an activation signal, described below, to deploy the restraint devices 140, 144. If the un-tripped rollover does not require deployment of the restraint devices 140, 144, the system 200 can remain idle. However, in alternative embodiments the system 200 can be configured to react differently to a non-deployment situation.

If the crash or event is considered or determined to be a soil- or curb-tripped rollover crash or event, the ECU 116 or processor 204 (FIG. 2) processes the sensed values according to rules set out by the system 200 as discussed above. For example, the lateral acceleration and the derivatives are compared to a predetermined threshold at block 516 as described with respect to the lateral acceleration comparator 209 of FIG. 2. Meanwhile, the sensed values from the roll rate sensor array 138 are fed to the roll value generator 212 and the roll value comparator of FIG. 2 as described earlier at block 520. If both the lateral acceleration comparator and the roll value comparator generate a "TRUE" signal, as determined at block 524, the signal is sent to an OR module as shown at block 526. The OR module also receives information determined from components that process un-tripped events. If a soil-tripped, curb-tripped, or un-tripped event that requires deployment of a restraint system has occurred, the ECU 116 then generates an activation signal (as shown at block 528), and the activation signal in turn is delivered to the restraint devices 140, 144 instructing them to deploy (as shown at block 532).

As can be seen in FIG. 6, in order for the system 200 (of FIG. 2) to produce or generate an activation signal or a decision to deploy the restraint devices 140, 144 in response to a soil-tripped event, all three soil-tripped blocks 508, 516, 520 need to produce a "TRUE" output signal. Namely, in the case of a soil-tripped crash, the classifier 208 of FIG. 2 needs to classify the crash as a soil-tripped rollover crash, a combination of the sensed lateral acceleration and the derivative needs to exceed the soil-tripped threshold in the lateral acceleration comparator 209, and the sensed values need to be deemed plausible by the roll value comparator 224. In the case of a curb-tripped crash, the classifier 208 of FIG. 2 needs to classify the crash as a curb-tripped rollover crash, a combination of the sensed lateral acceleration and the derivative needs to exceed the curb-tripped threshold in the lateral acceleration comparator 209, and the sensed values need to be deemed plausible by the roll value comparator 224. In some embodiments, a hold time is used to ensure or maintain the threshold crossing in block 516 until operations at block 520 are complete.

Figure 7:
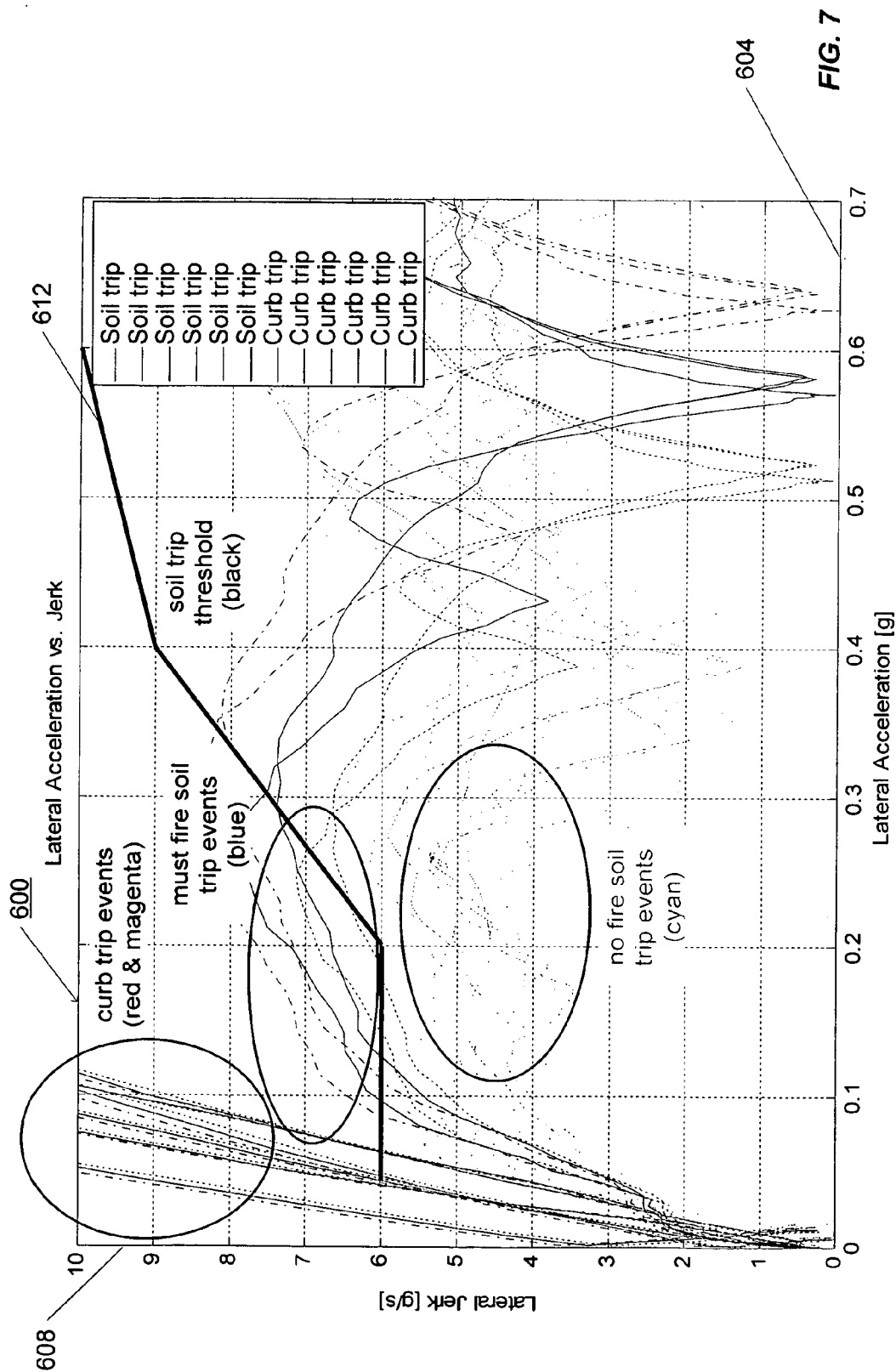
FIG. 7 is an exemplary soil-tripped threshold plot.

FIG. 7 shows an exemplary soil-tripped threshold plot 600. Sensed values of the lateral acceleration are measured along an x-axis 604, and values of the rate of change of the lateral acceleration (or lateral jerk) are measured along a y-axis 608. FIG. 7 also shows an exemplary soil-tripped threshold curve 612. The soil-tripped threshold 612 is used as a separation between non-deployment or no-fire, and deployment or fire soil-tripped rollover events. The separation between non-deployment and deployment generally occurs very early in a crash event. A hold time is used to maintain the soil-tripped threshold crossing decision until a path decision (discussed below) and the plausibility conditions (block 520 of FIG. 6) are met.

Figure 8:
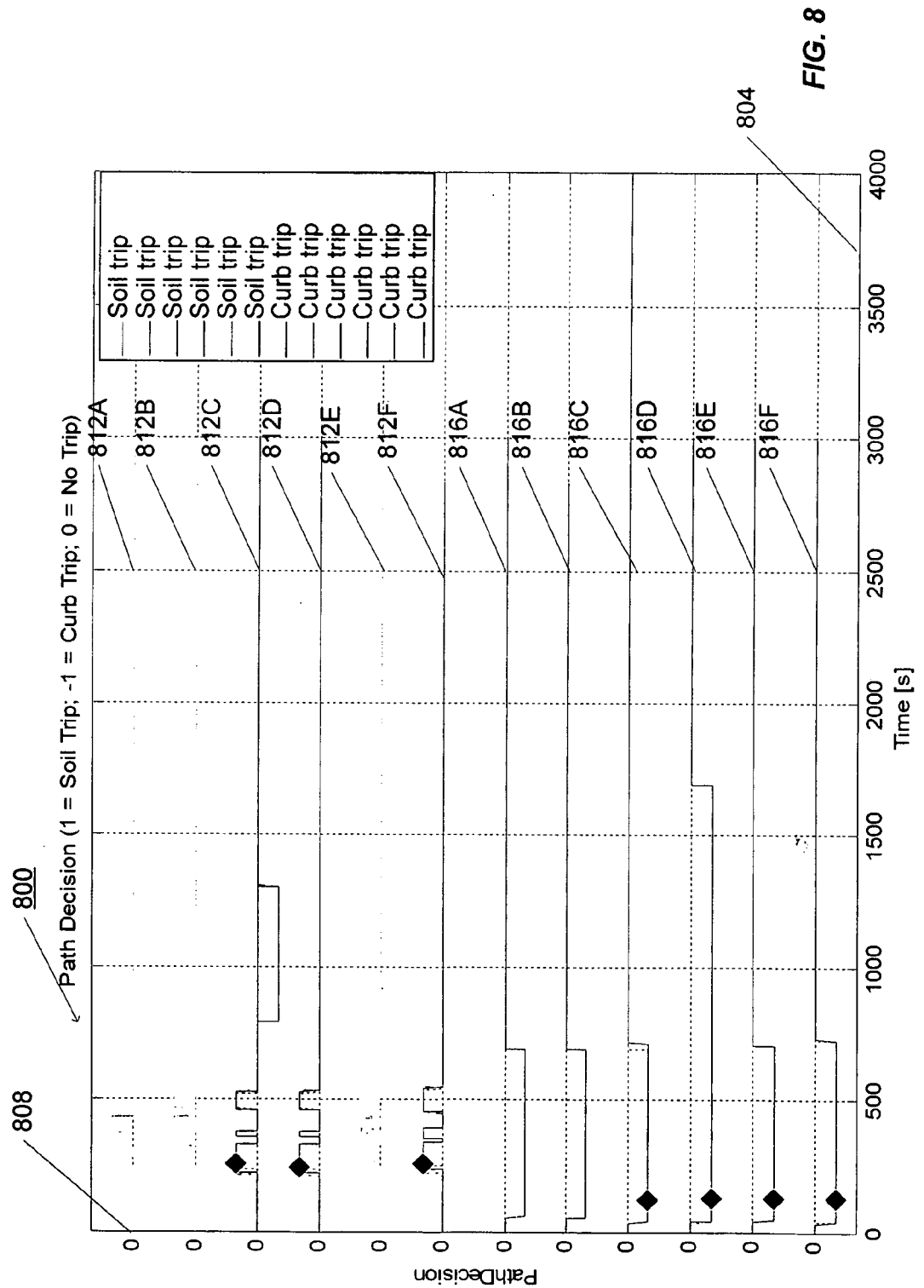
FIG. 8 is an exemplary path decision plot.
Figure 9:
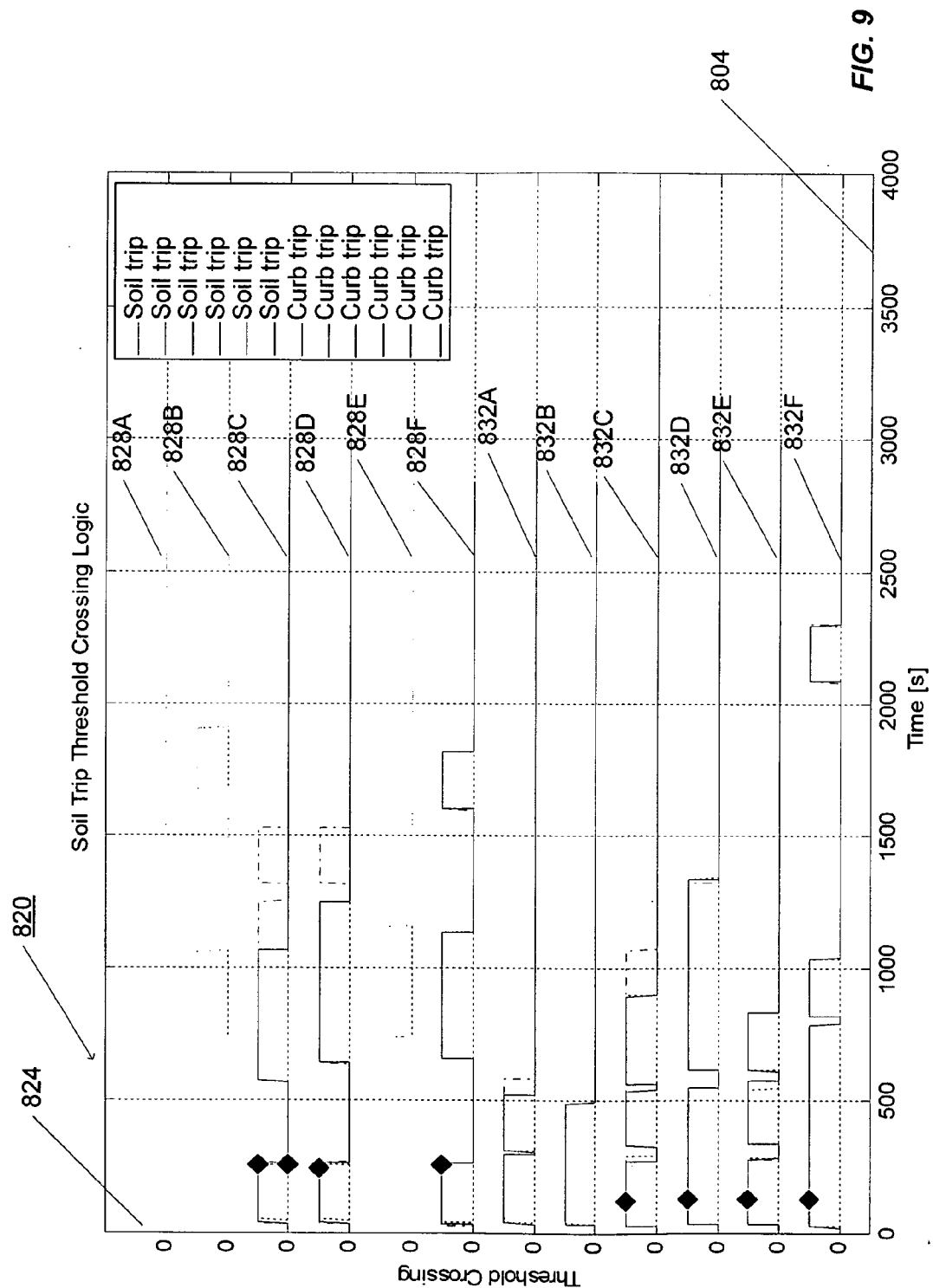
FIG. 9 is an exemplary threshold crossing plot.

FIG. 8 shows an exemplary path decision plot 800. Values of time are measured along an x-axis 804, and values of the path decisions are measured along a y-axis 808. The plot 800 shows a plurality of path decision outputs 812A-812F for soil-tripped rollovers, and outputs 816A-816F for curb-trip rollovers. Particularly, FIG. 8 shows that outputs 812C, 812D, and 812F indicate correct soil-tripped rollover detections prior to a required time-to-fire or time-to-deploy the restraint devices, and that outputs 816C, 816D, 816E, and 816F indicate correct curb-tripped rollover detections. Similarly, FIG. 9 shows an exemplary threshold crossing plot 820. Values of time are measured along an x-axis 804, and values of the threshold crossings are measured along a y-axis 824. The plot 820 shows a plurality of threshold crossings 828A-828F for soil-tripped rollovers, and outputs 832A-832F for curb-trip rollovers. Particularly, FIG. 9 shows a 200-ms hold time. However, other hold times can be used based on the application of interest. FIG. 9 also shows that most soil-tripped rollover and curb-tripped rollover events cross the thresholds. In the cases where the threshold is crossed, the threshold is crossed very early in the event.

Figure 10:
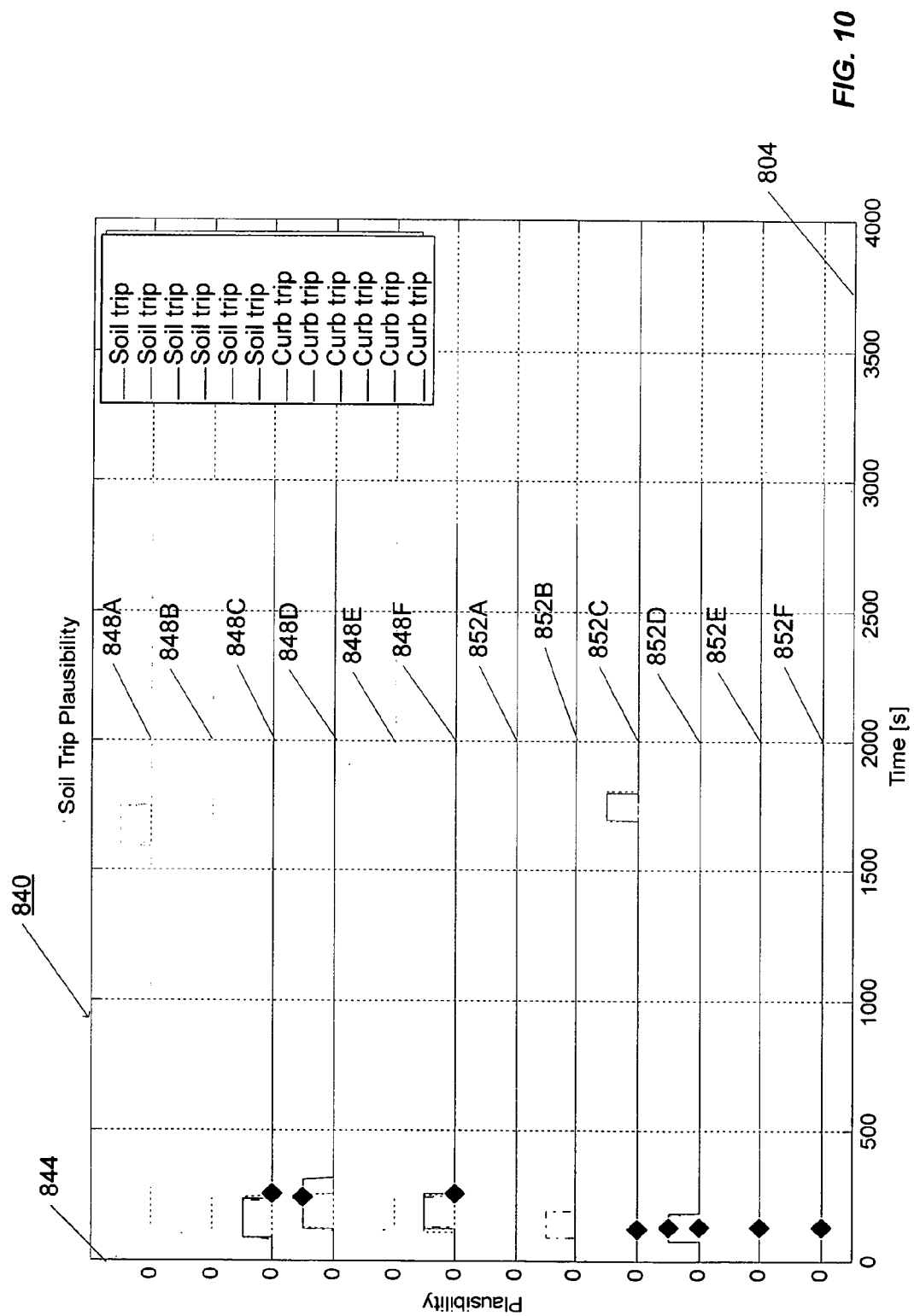
FIG. 10 is an exemplary plausibility plot.
Figure 11:
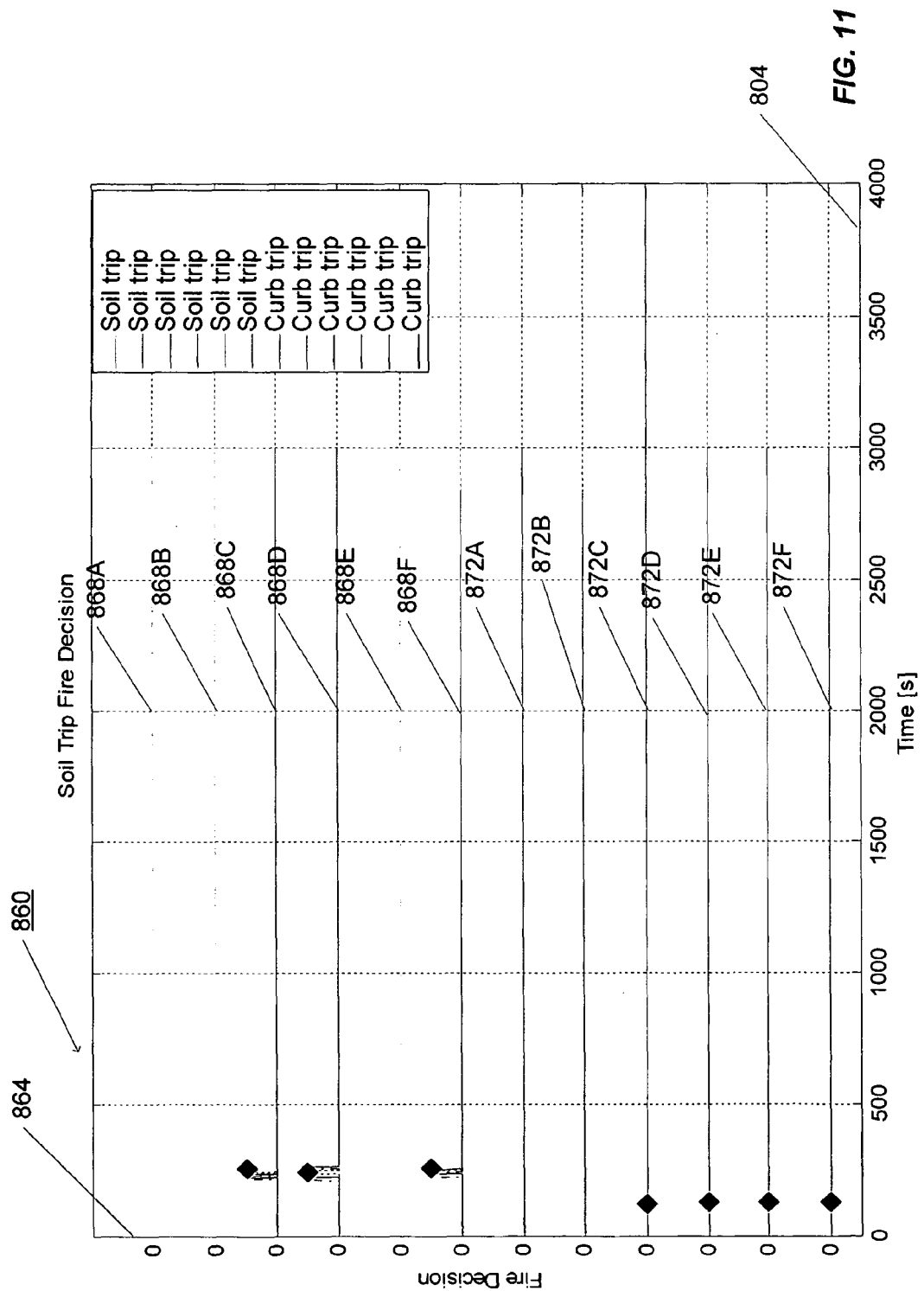
FIG. 11 is an exemplary deployment plot.

FIG. 10 shows an exemplary plausibility plot 840. Values of time are measured along an x-axis 804, and values of the path decisions are measured along a y-axis 844. The plot 840 shows a plurality of plausibility outputs 848A-848F for soil-tripped rollovers, and plausibility outputs 852A-852F for curb-trip rollovers. Particularly, FIG. 10 shows a plausibility module output with a 100-ms hold time. All soil-tripped rollover and curb-tripped rollover events enter the plausibility region. FIG. 11 shows a soil-trip deployment plot 860. Values of time are measured along an x-axis 804, and values of the path decisions are measured along a y-axis 864. The plot 860 shows a plurality of soil-trip deployment outputs 868A-868F for soil-tripped rollovers, and a plurality of curb-trip deployment outputs 872A-872F for curb-trip rollovers. Particularly, the plot 860 shows a deployment decision output for a calibrated sensor array. As shown, the output is from a Bosch RoSe Ig system, which is suitable for use in some embodiments of the invention. The outputs in the plot 860 are generated by a logical AND of the plots of FIGS. 8-10. For the sake of brevity, similar curb-trip deployment plots to illustrate curb-trip deployment decisions are not shown.

Various features of the invention are set forth in the following claims.

What is claimed is:

1. A method of controlling a restraint device in a vehicle during a crash, the method comprising:
   sensing a lateral condition;
   classifying the crash based on the lateral condition;
   sensing a roll value;
   comparing the roll value with a plausibility region; and
   activating the restraint device based on the classified crash and when the roll value falls within the plausibility region,
   wherein classifying the crash based on the lateral condition comprises
      determining a processed lateral condition from the lateral condition, wherein the processed condition comprises at least one of a derivative of the lateral condition, a slope of the lateral condition, and a rate of change of the lateral condition,
      comparing the lateral condition and the processed lateral condition to a soil-trip threshold,
      comparing the lateral condition and the processed lateral condition to a curb-trip threshold,
      activating the restraining device based on a soil-trip rollover crash when the lateral condition and the processed lateral condition cross the soil-trip threshold, and a curb-trip rollover crash when the lateral condition and the processed lateral condition cross the curb-trip threshold.

2. The method of claim 1, wherein the lateral condition comprises a lateral acceleration.

3. The method of claim 2, wherein the lateral acceleration further comprises one of a low-force acceleration and a high-force acceleration.

4. The method of claim 1, wherein classifying the crash based on the lateral condition further comprises:
   retrieving a set of lateral conditions and a set of processed lateral conditions;
   defining a plurality of lateral condition regions based on the set of lateral conditions and the set of processed lateral conditions;
   comparing the sensed lateral condition and the processed lateral condition with the lateral condition regions; and
   indicating a trip-rollover type if the sensed lateral condition and the processed lateral condition fall in one of the lateral condition regions, wherein the trip-rollover type comprises a soil-trip rollover and a curb-trip rollover.

5. The method of claim 1, wherein the roll value comprises one of a roll rate, a roll acceleration, and a roll angle, the method further comprising processing the roll value to obtain one of a derivative of the roll value and an integral of the roll value.

6. The method of claim 5, wherein comparing the roll value further comprises:
   defining the plausibility region with a set of angular roll rates and a set of angular accelerations; and
   determining if the roll value and the processed roll value fall in the plausibility region.

7. The method of claim 1, wherein classifying the crash further comprises introducing a hold time after which the crash is classified.

8. A method of controlling a restraint device in a vehicle during a crash, the method comprising:

generating a first signal indicative of a lateral acceleration of the vehicle;

determining a second signal from the first signal;

retrieving a trip-rollover region representing lateral accelerations and changes in lateral accelerations based on the first and second signals;

generating a third signal indicative of a roll rate of the vehicle;

determining a fourth signal from the third signal;

retrieving a plausibility region representing roll rates and changes in roll rates based on the third and fourth signals;

comparing the first and second signals to a soil-trip threshold;

comparing the first and second signals to a curb-trip threshold;

activating the restraint device when the first and second signals are in the trip-rollover region, and when the third and fourth signals are in the plausibility region, wherein the restraining device is activated based on a soil-trip rollover crash when the first and second signals cross the soil-trip threshold, and is activated based on a curb-trip rollover crash when the first and second signals cross the curb-trip threshold.

9. The method of claim 8, wherein the first signal further comprises at least one of a low-force acceleration and a high-force acceleration.

10. The method of claim 8, wherein the second signal comprises at least one of a derivative of the lateral acceleration, a slope of the lateral acceleration, and a rate of change of the lateral acceleration.

11. The method of claim 8, further comprising introducing a hold time after which the crash is classified.

12. A system for controlling a restraint device in a vehicle during a crash, the system comprising:

a lateral condition sensor configured to sense a lateral condition experienced by the vehicle;

a classifier configured to classify the crash based on the lateral condition;

a roll sensor configured to sense a roll condition experienced by the vehicle;

a comparator configured to compare the sensed roll value with a plausibility region;

a signal generator configured to activate the restraint device based on the classified crash and when the roll value falls within the plausibility region;

a processor configured to determine a processed lateral condition from the lateral condition, wherein the processed condition comprises at least one of a derivative of the lateral condition, a slope of the lateral condition, and a rate of change of the lateral condition; and a memory operable to store a plurality of lateral condition regions derived from calibrating a set of lateral conditions and a set of processed lateral condition, wherein the comparator is further configured to compare the sensed lateral condition and the processed lateral condition with the lateral condition regions, and wherein the processor is further configured to indicate a trip-rollover type if the sensed lateral condition and the processed lateral condition fall in one of the lateral condition regions, wherein the trip-rollover type comprises a soil-trip rollover and a curb-trip rollover.

13. The system of claim 12, wherein the lateral condition comprises a lateral acceleration.

14. The system of claim 13, wherein the lateral acceleration further comprises one of a low-force acceleration and a high-force acceleration.

15. The system of claim 12, wherein the comparator is further configured to compare the lateral condition and the processed lateral condition to a soil-trip threshold, and to compare the lateral condition and the processed lateral condition to a curb-trip threshold, and wherein the signal generator activates the restraint device based on a soil-trip rollover crash when the lateral condition and the processed lateral condition cross the soil-trip threshold, and a curb-trip rollover crash when the lateral condition and the processed lateral condition cross the curb-trip threshold.

16. The system of claim 12, wherein the roll condition comprises one of a roll rate, a roll acceleration, and a roll angle, wherein the processor is further configured to process the roll value to obtain one of a derivative of the roll value and an integral of the roll value.

17. The system of claim 12, wherein the processor is further configured to introduce a hold time after which the crash is classified.

18. The system of claim 12, further comprising a second comparator configured to retrieve the plausibility region derived from a set of angular roll rates and a set of angular accelerations, and to determine if the roll value and the processed roll value fall in the plausibility region.

19. A method of controlling a restraint device in a vehicle during a crash, the method comprising:

sensing a lateral condition;

determining a processed lateral condition based on the lateral condition, the processed lateral condition including at least one of a derivative of the lateral condition, a slope of the lateral condition, and a rate of change of the lateral condition;

classifying the type of crash based on the lateral condition and the processed lateral condition;

comparing the lateral condition and the processed lateral condition to a soil-trip threshold;

comparing the lateral condition and the processed lateral condition to a curb-trip threshold;

activating a restraint device based on a soil-trip rollover crash when the lateral condition and the processed lateral condition cross the soil-trip threshold and based on a curb-trip rollover crash when the lateral condition and the processed lateral condition cross the curb-trip threshold.

20. The method according to claim 19, further comprising:

sensing a roll value; and comparing the roll value with a plausibility region, wherein the restraint device is activated based on the classified type of crash and whether the roll value falls within the plausibility region.

21. A method of classifying a type of vehicle crash, the method comprising:

sensing a set of lateral conditions;

determining a set of processed lateral conditions based on the set of lateral conditions, each processed later condition including at least one of a derivative of the lateral condition, a slope of the lateral condition, and a rate of change of the lateral condition;

defining a plurality of lateral condition regions based on the set of lateral conditions and the set of processed lateral conditions;

comparing each sensed lateral condition and each processed lateral condition with the lateral condition regions; and classifying the crash as a trip-rollover type crash if a sensed lateral condition and a processed lateral condition fall in one of the lateral condition regions, wherein the trip-rollover type crash includes a soil-trip rollover and a curb-trip rollover.

22. The method according to claim 21, further comprising:
sensing a roll value; and
comparing the roll value with a plausibility region,
wherein the restraint device is activated based on the classified type of crash and whether the roll value falls within the plausibility region.

* * * * *